United States Patent
Shimada

(10) Patent No.: US 7,852,035 B2
(45) Date of Patent: Dec. 14, 2010

(54) MOTOR DRIVE CIRCUIT

(75) Inventor: Makoto Shimada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 564 days.

(21) Appl. No.: 11/916,117

(22) PCT Filed: May 31, 2006

(86) PCT No.: PCT/JP2006/310871

§ 371 (c)(1),
(2), (4) Date: Nov. 30, 2007

(87) PCT Pub. No.: WO2006/129706

PCT Pub. Date: Dec. 7, 2006

(65) Prior Publication Data

US 2010/0141199 A1    Jun. 10, 2010

(30) Foreign Application Priority Data

Jun. 3, 2005    (JP)    ............................. 2005-163432

(51) Int. Cl.
*H02P 8/18*    (2006.01)
(52) U.S. Cl. ............... 318/685; 318/400.12; 318/400.2; 318/599
(58) Field of Classification Search .................. 318/162, 318/400.12, 400.2, 599, 685, 696
See application file for complete search history.

(56) References Cited

U.S. PATENT DOCUMENTS

| | | | | | |
|---|---|---|---|---|---|
| 4,358,726 | A | * | 11/1982 | Iwakane et al. | 318/798 |
| 4,636,928 | A | * | 1/1987 | Deguchi et al. | 363/41 |
| 4,651,079 | A | * | 3/1987 | Wills | 318/811 |
| 5,386,182 | A | * | 1/1995 | Nikami | 318/293 |
| 5,444,340 | A | * | 8/1995 | Tamaki et al. | 318/139 |

FOREIGN PATENT DOCUMENTS

| | | |
|---|---|---|
| JP | 3-265499 | 11/1991 |
| JP | 7-67391 | 3/1995 |
| JP | 2003-180095 | 6/2003 |

* cited by examiner

*Primary Examiner*—Bentsu Ro
(74) *Attorney, Agent, or Firm*—Mattingly & Malur, P.C.

(57) ABSTRACT

To provide a motor driving circuit and a motor driving system wherein the circuit occupation area is small and the IC size can be reduced.

A polarity inversion data generating circuit is provided to use the higher-order bits of an address counter, which do not contribute to the access to a memory, as they are, as polarity inversion instruction data (flag bit). Then, two cyclic memory accesses are performed in the same direction to read a half period of waveform data twice. A polarity inversion instruction is issued for one of the waveform data as read twice. A calculation of the polarity inversion is performed in accordance with the polarity inversion instruction, whereby waveform data corresponding to one period of sinusoidal wave can be simply generated.

9 Claims, 3 Drawing Sheets

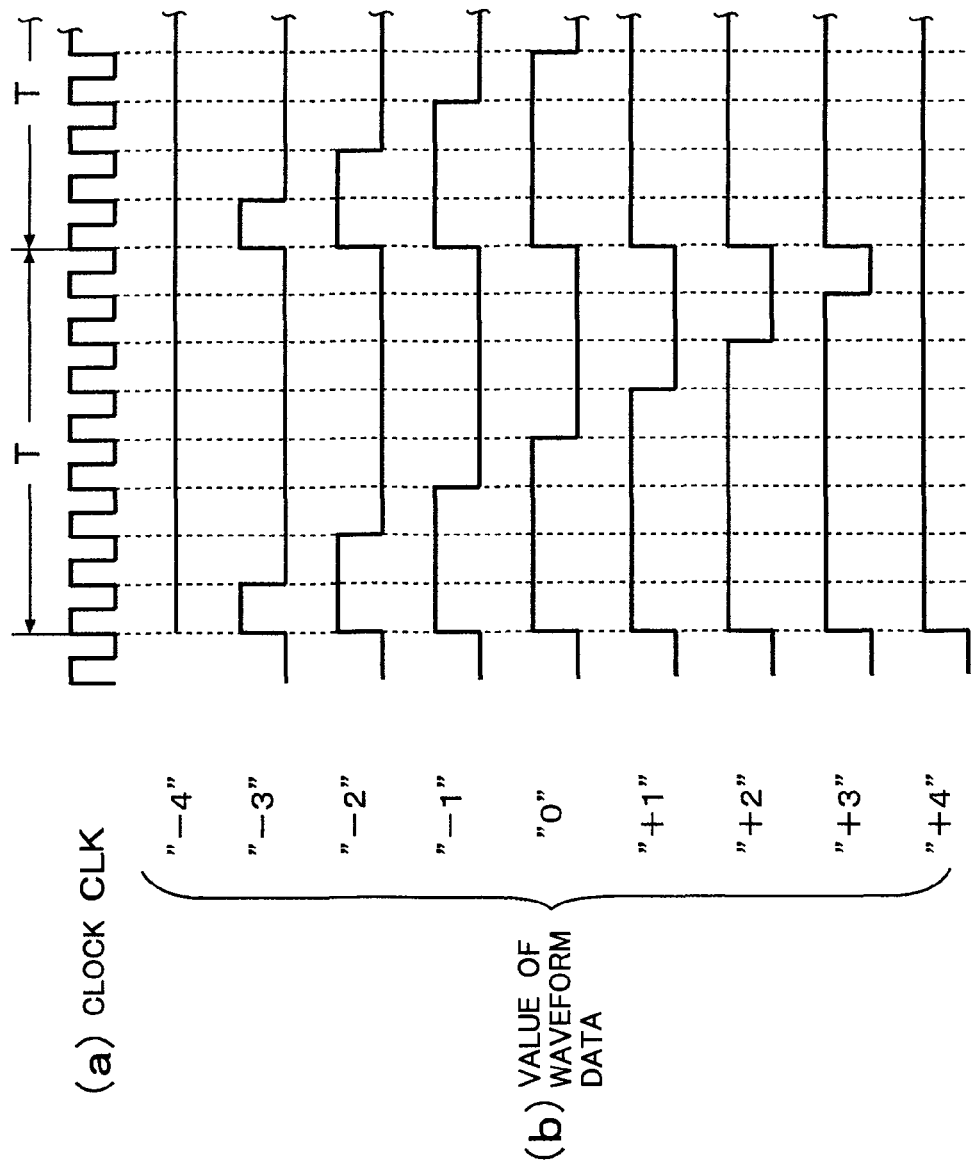

MOTOR DRIVE CIRCUIT

TECHNICAL FIELD

The present invention relates to a motor drive circuit and, in particular, the present invention relates to a motor drive circuit which is used in an audio/video device such as DVC (digital video camera) or DVD to drive a stepping motor under the micro-step control occupies a small circuit area and can miniaturize a driving IC.

BACKGROUND ART

The stepping motor is used for an auto-focusing control of a semiconductor fabrication device as well as various OA devices, audio/video devices. Particularly, in the audio/video reproducing device such as DVC and DVD or the semiconductor manufacturing device which requires a low vibration stepping motor, the driving of the stepping motor is controlled by a micro-step drive control signal approximated to a sine wave.

In the micro-step control, a current instruction table for respective phases of the stepping motor is stored in a memory (ROM), data in the table is read out from the memory with predetermined intervals and signals of instructed current values of the respective phases, which are approximated to the sine wave, are produced by time-division of a PWM pulse having width corresponding to the instruction current signal and the stepping motor is driven by the sine wave like currents supplied to exciting coils corresponding to the respective phases of the stepping motor.

The data for generating instruction current which is obtained by dividing the sine wave by several tens is usually stored in the current instruction table as the waveform data (Patent Publication 1).

It is usual that an output circuit of such motor drive circuit includes an output stage which is usually a CMOS H type bridge circuit (referred to as "H bridge circuit", hereinafter). A single phase motor driver for controlling a motor by supplying a PWM pulse to such H bridge circuit is known (Patent Publication 2). Further, there is a motor drive circuit having an output stage which current-drives a motor by a waveform approximated to the sine waveform for ON/OFF controlling push-side transistor and a pull-side transistor by PWM pulse is also known (Patent Publication 3).

Patent Publication 1 JP-A-03-265499
Patent Publication 2 JP-A-07-67391
Patent Publication 3 JP-A-2003-180095

DISCLOSURE OF THE INVENTION

Problem to be Solved by the Invention

In the micro-step drive described in Patent Publication 1 (JP-A-03-265499), a waveform data corresponding to one fourth of a sine waveform is preliminarily stored in a memory (ROM) for storing the current instruction table and a bit data inverting circuit inverts a bit value of an access address every 90° of the sine waveform to thereby switch an address direction of access of the data in the memory oppositely such that a waveform data approximated to a half period of the sine wave on a positive polarity side is read out. For a data of a half period on a negative polarity side which is to be read out next, the next waveform of the half period on the positive polarity side is read out by switching the drive circuit to the negative polarity side to switch the data access direction to the other direction and access the memory according to a polarity switching signal. As a result, a drive current corresponding to the waveform data of one period of the sine wave is obtained totally.

In the micro-step drive described in Patent Publication 1, the memory (ROM) stores waveform data corresponding to four amplitudes. Since these sine waves having these amplitudes become a waveform data corresponding to one-fourth of a sine wave, it is possible to reduce capacity of the ROM storing the current instruction table for four sine waves.

Incidentally, the stepping motor driven by sine wave is advantageous in reducing size and weight thereof. However, a micro-step controlled motor drive circuit used to drive the stepping motor includes, other than the current drive circuit, a CPU (controller) and a memory, etc. Therefore, when the micro-step controlled motor is fabricated as an IC, the IC becomes an ASIC which is large package or a μ control IC and miniaturization thereof is difficult. When the micro-step controlled motor drive circuit is mounted on the stepping motor integrally, the motor drive circuit juts out of the stepping motor and, therefore, it is difficult to mount it on the motor or the device.

In the micro-step drive disclosed in Patent Publication 1 which does not use a CPU (controller), a waveform data generator circuit is constituted with the memory for storing waveforms corresponding to amplitudes and an address counter for counting clocks. Therefore, the fabrication of the waveform data generator circuit as an IC is facilitated. In such case, however, a switching circuit for switching an addressing direction along which the memory is accessed is necessary in the motor drive circuit even if the capacity of the memory is reduced. Further, since the waveform data in only one of the positive polarity side and the negative polarity side of the sine wave can be generated, the number of peripheral circuits, which are necessary to produce a drive waveform for one period, is increased and the timing control becomes complicated. Moreover, a switching circuit for switching current direction according to the polarity switching signal is necessary in an output stage circuit of the drive circuit. In order to extract an upper bit, the size of the peripheral circuit other than the memory, such as a multiplier for extracting upper significant bit is increased, so that the miniaturization of the motor drive IC is difficult.

An object of this invention is to resolve such problems in the conventional art and to provide a motor drive circuit occupying small area and can be miniaturized.

Means for Solving the Problem

In order to achieve the object, the motor drive circuit according to this invention, which current-drives a motor by PWM pulses corresponding to values of a plurality of waveform data approximated to a sine wave for a predetermined period and stored in a memory, is featured by comprising an address counter, a polarity inverted data generator circuit for generating a data having polarity inverted from positive to negative or from negative to positive and a PWM pulse generator for generating the PWM pulses, wherein the predetermined period is a half period, the address counter has digits the number of which is larger than the number of bits of an access address storing the waveform data of the memory by one bit or more, a certain bit of the one bit or more in the bit positions of said address counter is used as a flag bit or flag bits for inverting a polarity of the waveform data from positive to negative or from negative to positive, and the polarity inverted data generator circuit responds to the data read out from the memory and the flag bit or bits and generates the data having polarity inverted from positive to negative or negative to positive according to a value or values of the flag bit or flag bits, whereby a waveform data corresponding to one period of the sine wave is obtained by producing the waveform data for a half period read out from said memory.

Effect of the Invention

In this invention, the upper digit of the address counter, which does not attribute to the access of the memory, is directly used as the data (flag bit) for ordering the polarity inversion to the polarity inverted data generator circuit. Therefore, it is possible to easily generate the waveform corresponding to one period of the sine wave by reading the waveform data for a half period twice by accessing the memory twice in one direction, ordering the polarity inversion of the waveform data read out in either one of the two accesses and processing the polarity inversion arithmetically. Therefore, it is possible to generate sine waves continuously by merely continuously accessing the memory circularly.

As a result, the access control of the memory becomes simple, the generation of data corresponding to amplitude of the motor driving current by arithmetic processing or an arithmetic circuit becomes easy and the amplitude regulation of the waveform data becomes possible by regulating the amplitude by providing, for example, an amplitude regulation circuit for the waveform of one period, which is generated by the reading of the memory, without necessity of storing a number of waveform data corresponding to the amplitude in the memory. Further, since it becomes unnecessary to provide a circuit for instructing the switching of current direction and a multiplexer, etc., in the output stage circuit, etc., as disclosed in Patent Publication 1, it is possible to reduce the circuit size correspondingly.

In this invention, it is possible to continuously generate the sine waveform by accessing the memory in one direction circularly. In the PWM pulse generator circuit, it is possible to generate the PWM pulses corresponding to the waveform data of one period by setting duty cycle at the zero-crossing point of the sine wave to 50% and making a pulse width corresponding to a drive current value from the negative side peak to the positive side peak using duty cycle of 50% as a reference. In such case, the current output circuit becomes simple and it is possible to reduce the circuit size.

As a result, it is possible to easily realize the motor drive circuit which occupies a small area and can be reduced the size of the IC. Particularly, the IC can be easily mounted on the motor side of, particularly, a small size stepping motor.

BEST MODE FOR CARRYING OUT THE INVENTION

FIG. 1 is a block diagram of an embodiment of the motor drive circuit of the invention, FIG. 2 shows waveform data stored in a memory and a polarity flag obtained from a counter and FIG. 3 shows a generation of PWM pulse of duty cycle of 50% by a PWM pulse generator circuit.

In FIG. 1, a reference numeral 10 depicts a micro-step controlling motor drive circuit for driving a stepping motor, which is provided as an IC. A reference numeral 1 depicts a ROM (memory) for storing a waveform data approximated to a sine wave, 2 depicts an address counter accessing the memory 1, 3 depicts a polarity inverted data generator circuit, 4 depicts an amplitude regulation data generator circuit, 5 depicts a PWM pulse generator circuit, 6 depicts a H bridge circuit, 7 depicts a 1/m frequency divider circuit (m is an integer equal to or larger than 1) and 8 depicts a control circuit whose size can be reduced.

A clock generator circuit 11 and a stepping motor (M) 12 are provided externally of the motor drive circuit 10.

A waveform dapta corresponding to a half period of sine wave is divided by the number of addresses of the memory 1 and stored in the respective addresses as digital value data. That is, the waveform data of the half period are composed of a plurality of data corresponding to the addresses.

Incidentally, the drive for one of multiple phases will be described. In a case of the multiphase drive, memory regions of the memory 1 are assigned to the respective phases so that waveform data corresponding to the respective phases are provided. In such case, it is enough to access the respective addresses of the memory by address counters corresponding to the respective phases. Further, the circuits except the memory 1, the 1/m frequency divider 7 and the control circuit 8 may be provided for each of the phases such that drive waveforms corresponding to the respective phases are generated. It is of course possible to provide the memory for each phase. Further, it is possible to provide in common the respective circuits for each phase. In such case, the operation is performed under the time-divisional control.

Significant bits of the address counter 2 except the most significant bit correspond to an address space of the memory 1 in which the half period waveform data is stored. That is, the number of digits of the address counter 2 is larger by 1 bit than the number of bits of the address space of the memory 1 in which the waveform data is stored.

The most significant bit (MSB) of the address counter 2 is inputted to the polarity inverted data generator circuit 3. The address counter 2 is an n-digit counter (n is a positive integer) which receives the clock CK (frequency dividing clock) through the 1/m frequency divider 7 and incremented correspondingly to the frequency dividing clock CK. The clock CLK before frequency division is inputted from the clock generator circuit 11 to the 1/m frequency divider circuit 7, the amplitude regulation data generator circuit 4, the PWM pulse generator circuit 5 and the control circuit 8, through a terminal 10a.

The address counter 2 counts from 0 up to n−1 and returns to 0 at the maximum value n so that it generates the address value which circulates every n pulses. The count value of the address counter 2 varies correspondingly to the increment due to the frequency divided clock CK and the memory 2 is accessed circularly. As a result, the respective digital data value constituting the waveform data for the half period approximated to sine wave are read out from the addresses of the memory 1 sequentially.

The polarity inverted data generator circuit 3 calculates complement of 2 in synchronism with the clock CLK and the frequency divided clock CR by inverting the polarity of inputted data from positive to negative or vice versa according to the flag bit. That is, the polarity inverted data generator circuit 3 receives the most significant bit (MSB) of the address counter 2 as the flag bit and, when the flag bit is "1", calculates the complement of 2 of the data received from the memory 1 to generate the data attached with a code bit as the negative side waveform data. When the flag bit is "0", it outputs the data value by attaching a code bit on the positive polarity side to the received waveform data.

As a result, when the address counter 2 counts two rounds and the memory 1 is accessed twice, the half period waveform data is read out twice and the waveform data corresponding to one sine wave period is outputted from the polarity inverted data generator circuit 3 in synchronism with the frequency divided clock CK.

The amplitude regulation data generator circuit 4 receives the clock CLK and the frequency divided clock CK, the control signal S from the controller 8 which determines amplitude of the drive current and the waveform data corresponding to the one period of sine wave which is obtained from the polarity inverted data generator circuit 3 and multiplies the waveform data by K according to the control signal S and in synchronism with the frequency divided clock CK. The amplitude regulation data generator circuit 4 sequentially generates data, which corresponds to one period of sine wave converted into data of waveform having a predetermined amplitude, in synchronism with the frequency divided clock CK and sends the data to the PWM pulse generator circuit 5. Incidentally, a value of K is set correspondingly to the control signal S. The controller 8 receives the clock CLK and external instruction signal A through an input terminal 10b of the motor drive circuit 10 and generates the predetermined control signal S.

In, for example, a DVC (digital video camera), the control signal S is generated correspondingly to a focusing control. The control signal functions to generate large torque by converting the waveform data into a sine wave having a large amplitude in the drive start time and to reduce the torque by gradually reducing the amplitude of the sine wave when the motor approaches a drive stop position.

The PWM pulse generator circuit 5 repeatedly converts the sine waveform data approximated to one period of a sine wave corresponding to the amplitude assigned by the amplitude regulation data generator circuit 4 into PWM pulses having a predetermined period T (to be described later) according to the clock CLK and drives the H bridge circuit 6. Therefore, the H bridge circuit 6 outputs the drive current corresponding to the PWM pulse to the stepping motor 12 through a terminal 10c and the stepping motor 12 is driven by the sine wave chopped at predetermined period T.

FIG. 2 shows the waveform data stored in the memory 1 and the polarity bits obtained from the address counter. In order to facilitate the explanation, it is assumed that the number of digits of the address counter 2 is 3 bits (A0, A1, A2) and the number of digits of the memory address is 2 bits (A0, A1).

The lower significant bits (A0, A1) in the first and second digits of the address counter 2 are assigned to the access addresses of the memory 1. The third digit (most significant bit A2) is used as the polarity inversion instruction flag which is inputted to the polarity inverted data generator circuit 3. In FIG. 2, the lower significant bits (A1, A0) are shifted from "00" through "01" and "10" to "11" in one round and, when the lower significant bits pass the maximum count value, the most significant bit A2 is shifted from "0" to "1" and the lower significant bits are returned to "00" and shifted therefrom to "01", "10" to "11" again. When this shift is completed, the most significant bit A2 is returned to "0" and the address values (A1, A2) become "00". Therefore, the sine wave is generated continuously by accessing the memory 1 circularly.

A waveform corresponding to a waveform portion 9a of the sine wave 9 on the positive polarity side is stored in the respective address positions of the memory 1 when the most significant bit is "0". When the most significant bit is "1", the data assigned to the respective address positions are assigned to the waveform data corresponding to a waveform 9a of the sine wave 9 on the negative polarity side. Incidentally, this assignment may be reversed.

Since the digital value becomes twice when it is shifted up by one digit as shown in FIG. 2, the number of waveform data corresponding to one period of sine wave which are assigned to the respective addresses is divided by 2 (shift down it by one digit) and the respective half values are assigned as the waveform data corresponding to the positive side waveform 9a (or negative side) of the sine wave 9. As mentioned, the waveform data of the negative side waveform 9b is generated by obtaining the complement of 2 with respect to the waveform data of the positive side waveform 9a. In this case, the data value of the memory 1 is 2 bits, A0 and A2. However, when the data value is, for example, 4 bits "0001", the complement of 2 becomes "1111". Therefore, the polarity inverted data generator circuit 3 performs the calculation of the complement of 2 for lower significant bit when the most significant bit is "1".

Incidentally, the complement of 2 of "0000" is "0000". Further, when the complement of 2 is displayed, the code bit indicative of the polarity is attached to the most significant bit. When the most significant bit is "0", the code bit is positive and, when the most significant bit is "1", the code bit is negative. The most significant bit A2 of the address counter 2 is used as this code bit.

By the way, it is possible to represent a positive number as a negative number by adding 1 to the most significant bit of an absolute value of the positive number. Therefore, when the most significant digit is the polarity flag and data values are assigned to the lower significant bits as shown in FIG. 2, it is not necessary to practically calculate the complement of 2 by the polarity inverted data generating circuit 3. Incidentally, the complement of 2 can be provided by inverting the respective bits of the data, obtaining the complement of 1 of the inverted bits and adding 1 to the complement.

FIG. 3 shows how to generate the PWM pulse having duty cycle of 50% at zero cross point of the sine wave by the PWM pulse generator circuit 5. In order to facilitate the explanation, it is assumed that, according to the waveform data corresponding to a half period of the sine wave on the positive polarity side outputted from the memory 1, the amplitude regulation data generator circuit 4 generates digital values in a range from "−4" to "0" and from 0 to "+4" (in a case of the maximum amplitude) of the waveform data of one period. This will be described with reference to FIG. 3 under assumption that the PWM pulse generator circuit 5 receives this data from the amplitude regulation data generator circuit 4 and the chopping drive period of the stepping motor (M) 12 is 8 clocks CLK (=the predetermined period T).

In FIG. 3, the clock CLK generated by the clock generator circuit 11 is shown by (a) and the PWM pulse generated correspondingly to the waveform data value stored in the memory 1 is shown by (b).

When the PWM pulse generator circuit 5 receives the digital value "−4" corresponding to the maximum peak value on the negative polarity side in the predetermined period T (the period of 8 clocks), the PWM pulse generator circuit 5 does not generate any pulse (generates pulse having width "0"), as shown in FIG. 3. When it receives the digital value "0", it generates the PWM pulse having duty cycle of 50%. Further, when the PWM pulse generator circuit 5 receives the digital value "+4" corresponding to the maximum peak value on the positive polarity side, the PWM pulse generator circuit 5 generates the PWM pulse having duty cycle of 100%. That is, the duty cycle (%) corresponds to a range of sine wave from local minimum to local maximum.

As a result, the PWM pulse having duty cycle, which changes from 0% to 50% correspondingly to the value of the waveform data on the negative polarity side, is generated. In the waveform data on the positive polarity side, the PWM pulse having duty cycle, which changes from 50% to 100% correspondingly to the value of the waveform data, is generated.

As such, for a pulse having duty cycle of 50% as a reference, it becomes possible to easily and continuously generate a waveform corresponding to a sine wave in which the positive polarity side and the negative polarity side alternate.

Such generation of PWM pulse can be realized by setting an off-set value (digital value corresponding to the level of zero-cross points of sine wave) corresponding to duty cycle of 50% internally and adding the off-set value to the waveform data value obtained from the amplitude regulation data generator circuit 4.

When the offset value is digital value is set to, for example, digital value 4 and when the waveform data value "−4" is received, it becomes −4+4=0, so that a pulse whose clock number is zero is produced. When the waveform data value "0" is received, a pulse having pulse width of which clock number is 0+4=4, so that a pulse having pulse width of which clock number is 4 is produced and, when the waveform data value "+4" is received, it becomes 4+4=8, so that a pulse having pulse width of which clock number is 8 (corresponding to the predetermined period T) is produced.

That is, the PWM pulse generator circuit 5 produces a pulse having pulse width corresponding to the number of clocks CLK which corresponds to the calculated digital value. Therefore, the PWM pulse generator 5 can easily be constructed with a counter, a gate circuit and a flip-flop.

As a result, since the data corresponding to one period of sine wave is produced by these circuits provided upstream of the PWM pulse generator circuit 5, the PWM pulse generator circuit 5 which has a small circuit size can easily produce the PWM pulse by counting the clocks CLK. Therefore, it is possible to generate the chopper-controlled drive current in every period T (8 clocks period). Incidentally, the predetermined period T may be T=2 k×clock period, where k is an integer not smaller than 3.

The H bridge circuit 6, which is an output circuit for outputting the drive current, may include a CMOS drive transistor. In such case, it is enough to ON/OFF control the drive transistor such that the drive transistor does not output the drive current when the H bridge circuit 6 receives a pulse having duty cycle of 50% corresponding to the data value "0" in FIG. 3(*b*), supplies the drive current to the stepping motor (M) 12 in one direction when the circuit receives a pulse having duty cycle larger than 50% and supplies the drive current to the stepping motor (M) 12 in the other direction when the circuit receives a pulse having duty cycle smaller than 50%.

In a case where the data value is, for example, "−4" to "−1", it is possible to utilize a pulse having the width corresponding to the data value "−4" to "−1" shown in FIG. 3(*b*). That is, since the "H" period of the pulse having duty cycle 50% corresponds to the negative polarity side of the sine wave, it is enough to drive the drive transistor with pulses corresponding to the negative polarity side of the sine wave during the pulse having duty cycle 50%. On the other hand, in a case where the data value is, for example, "+4" to "+1", the "L" period of the pulse having duty cycle 50% corresponds to the positive polarity side of the sine wave. Therefore, it is enough to drive the drive transistor by inverting the pulse having duty cycle 50% corresponding to the data value "0", generate a drive pulse by supplying the inverted signal and the pulse having data value "+1" to "+4" shown in FIG. 3(*b*) to an AND gate and driving the drive transistor with pulses corresponding to the positive polarity side of the sine wave during the inverted pulse duty cycle 50% is "H".

Incidentally, the H bridge circuit usually has two CMOS transistors, that is, a current discharge side CMOS drive transistor on one side of exciting coil of the motor and a current sink side CMOS drive transistor on the other side of the exciting coil. When one of these transistors is driven as mentioned above, the other transistor is driven during the pulse is "H" by supplying the pulse having duty cycle 50% or the pulse obtained by inverting the pulse having duty cycle 50%. Therefore, the drive circuit becomes a simple circuit.

Incidentally, the extreme value on the negative side of the PWM pulse shown in FIG. 3 has a pulse width "0". Therefore, when an analog circuit is driven by the PWM pulse, it is possible to convert the PWM pulse into a current value corresponding to the pulse width thereof. Thus, it is possible to generate a sine wave drive current by supplying the PWM pulse having such pulse width to a current drive circuit of analog type.

In such case, it is possible to convert a signal corresponding to the pulse width of the PWM pulse into a voltage value by supplying the signal to a comparator having a reference voltage +Vcc/2 through an integration circuit. Incidentally, when the pulse having duty cycle of 50% is supplied to the comparator, the current is not outputted by setting the voltage value of the integration circuit to a half of the power source voltage +Vcc, that is, +Vcc/2. When the voltage of the integration circuit is higher than +Vcc/2, a drive current in a predetermined direction is outputted to the stepping motor 12. When the voltage of the integration circuit is lower than +Vcc/2, it is enough to generate the drive current, the direction of which is opposite to the predetermined direction and supplying it to the stepping motor 12.

INDUSTRIAL APPLICABILITY

In the described embodiment, the flag bit indicative of the polarity of the sine wave is utilized as the most significant bit. However, when another timing data is inserted into between the waveform data of a half period and the waveform data of the next half period of the sine wave, the number of bits of the address counter is increased with respect to the number of address bits of the memory (ROM) for the waveform data. In such case, it is of course possible in the present invention to use not the most significant bit but a bit immediately higher the address space (the most significant bit of the access address of the memory) or a bit higher than the bit immediately higher than the address space.

The amplitude regulation data generator circuit 4 is not limited to that for regulating amplitude by digital value and may include a D/A converter circuit provided therein for converting the digital value into an analog value to regulate the amplitude with respect to the analog value. In such case, the PWM pulse may be generated correspondingly to the analog value obtained by the D/A converter circuit.

Further, although the memory for storing waveform data is described as the ROM in the described embodiment, the memory may be a general memory. Although the current drive circuit drives the stepping motor in the described embodiment, the motor to be driven is not limited to the stepping motor and any motor can be driven by the current drive circuit provided that the current drive circuit drives the motor by the sine wave current.

Furthermore, although the output stage circuit of the motor drive circuit is the H bridge circuit in the described embodiment, the output stage circuit may be a mere switch circuit for ON/OFF switching the current supplied from the power source line.

BRIEF DESCRIPTION OF THE DRAWINGS

FIG. 3 shows PWM pulse generated by a PWM pulse generator circuit and having a zero-cross point of sine wave of duty cycle 50%.

DESCRIPTION OF REFERENCE NUMERALS AND SIGNS

Figure 1:
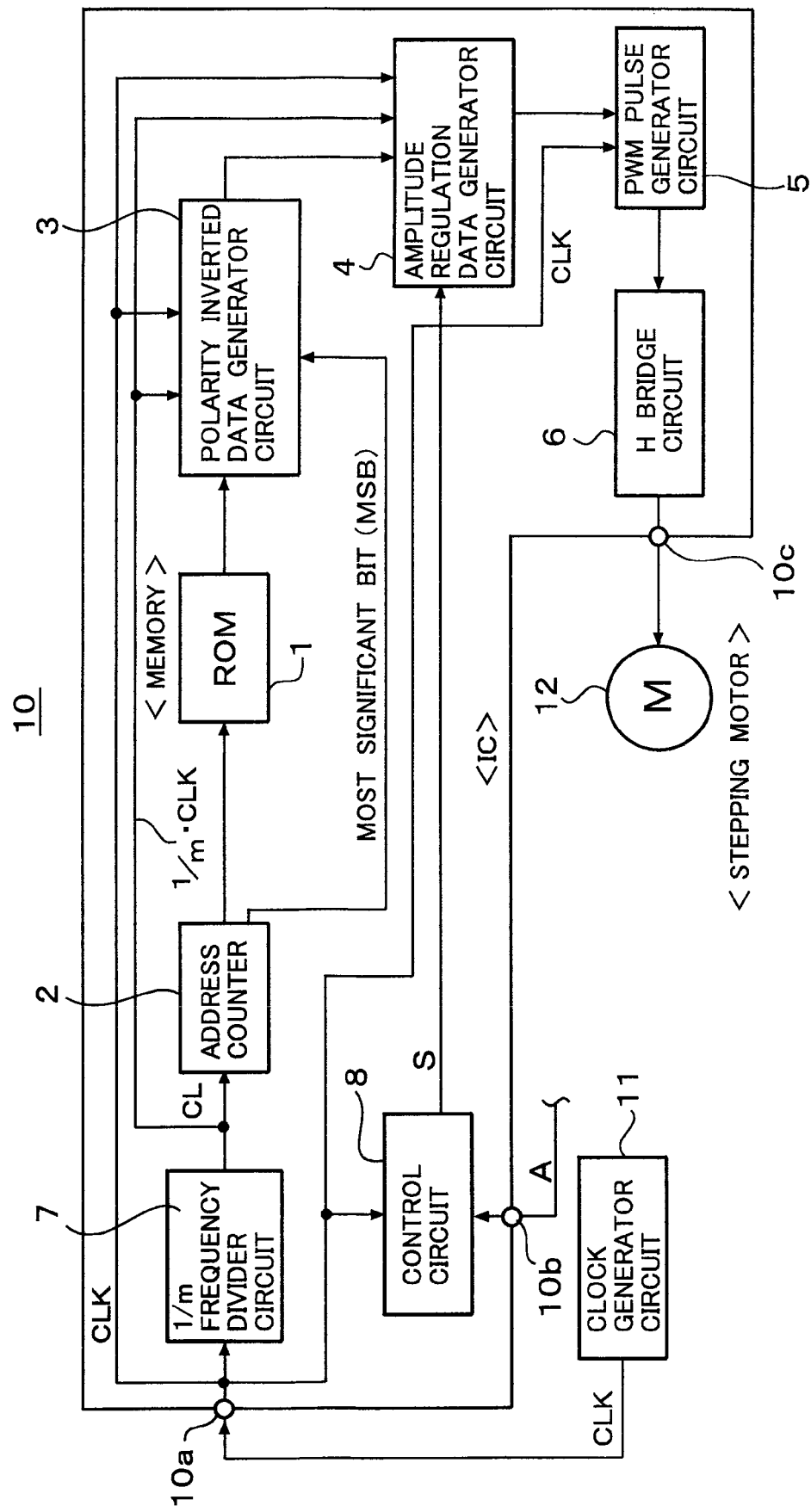
FIG. 1 is a block circuit diagram of an embodiment to which a motor drive circuit of the present invention is used.
Figure 2:
FIG. 2 illustrates waveform data stored in a memory and polarity flag obtained from a counter.

1 ... ROM (Memory),
2 ... address counter,
3 ... polarity inverted data generator circuit,
4 ... amplitude regulation data generator circuit,
5 ... PWM pulse generator circuit,
6 ... H bridge circuit,
7 ... 1/m frequency divider circuit,
8 ... control circuit,
9 ... sine waveform data,
11 ... clock generator circuit,
12 ... stepping motor

The invention claimed is:

1. A motor drive circuit for current-driving a motor by PWM pulse generated by reading waveform data composed of a plurality of data and approximated to a sine wave for a predetermined period stored in a memory, comprising:
an address counter;
a polarity inverted data generator circuit for generating data having polarity inverted from positive to negative or from negative to positive; and
a PWM pulse generator circuit for generating the PWM pulse,
wherein the predetermined period is a half period,
said address counter has digits the number of which is larger than the number of bits of an access address storing the waveform data of said memory by one bit or more, a certain bit of the one bit or more in the bit positions of said address counter is used as a flag bit or flag bits for inverting a polarity of the waveform data from positive to negative or from negative to positive, and the polarity inverted data generator circuit responds to the data read out from the memory and the flag bit or bits and generates the data having polarity inverted from positive to negative or negative to positive according to a value or values of the flag bit or flag bits, whereby a waveform data corresponding to one period of the sine wave is obtained by producing the waveform data for a half period read out from said memory.

2. A motor drive circuit as claimed in claim 1, wherein the access address of said memory in which the waveform data is stored is accessed two rounds by said address counter to read the waveform data from said memory twice, the flag bit indicates the polarity inversion of respective data read out from said memory in either one of the two rounds from positive to negative or from negative to positive, and said PWM pulse generator circuit generates the PWM pulses according to the waveform data for the one period.

3. A motor drive circuit as claimed in claim 2, wherein the flag bit is the most significant bit, the waveform data for the half period is a waveform corresponding to a sine wave on the positive polarity side, said polarity inverted data generator circuit includes an arithmetic calculation circuit for inverting the polarity of data value read out from said memory from positive to negative when the flag bit indicates the negative polarity side.

4. A motor drive circuit as claimed in claim 3, wherein said memory is a ROM, said polarity inverted data generator circuit outputs the data value read out from said memory as it is when the flag bit indicates the positive polarity side and generates the PWM pulses corresponding to the sine wave continuously when said ROM is accessed circularly.

5. A motor drive circuit as claimed in claim 4, wherein said PWM pulse generator circuit generates a PWM pulse, duty cycle of which corresponds to a width between a negative side peak and a positive side peak of the sine wave with duty cycle at a zero cross point being 50%.

6. A motor drive circuit as claimed in claim 5, further comprising a current output circuit for generating a drive current for driving said motor and an amplitude data generator circuit, wherein said amplitude data generator circuit responds to an output data of said polarity inversion data generator circuit and a control signal for regulating an amplitude of a drive current to convert the output data into a predetermined data having amplitude corresponding to the control signal and outputs the predetermined data to said PWM pulse generator circuit, said PWM pulse generator responds to the data from said amplitude data generator circuit to generate the PWM pulse at a predetermined period and supplies the PWM pulse to said current output circuit and said current output circuit generates a drive current which is chopped with the predetermined periods.

7. A motor drive circuit as claimed in claim 6, wherein said arithmetic calculation circuit generates a complement of 2 and outputs it to said amplitude data generator circuit when the flag bit is one of "0" and "1", said arithmetic calculation circuit outputs the data read out from said memory to said amplitude data generator circuit by attaching a positive code bit to the data read out from said memory when the flag bit is the other of "0" and "1" and said PWM pulse generator circuit generates the PWM pulse having a period which is integer times a predetermined clock period corresponding to the value of the data from said amplitude data generator circuit, where the integer is not smaller than 1.

8. A motor drive circuit as claimed in claim 7, further comprising a 1/m frequency divider circuit, where m is an integer not smaller than 1, wherein said 1/m frequency divider circuit responds to a clock supplied externally to generate a clock having frequency obtained by dividing the external clock frequency by m where m is an integer not smaller than 1, said address counter, said amplitude data generator circuit and said polarity inversion data generator circuit are operated in response to the clock generated by said frequency divider circuit, said PWM pulse generator circuit generates the PWM pulse in response to the external clock as the predetermined clock.

9. A motor drive circuit as claimed in claim 8, wherein the predetermined period of the PWM pulse is 2 k times the period of the external clock, where k is an integer not smaller than 3.

* * * * *